July 29, 1958   K. H. SCHÜTZ   2,845,013
DIAPHRAGM-ADJUSTING MECHANISM FOR PHOTOGRAPHIC OBJECTIVES
Filed Jan. 17, 1956

INVENTOR.
KarlHeinz Schütz
BY
Karl F. Ross
AGENT

United States Patent Office 2,845,013
Patented July 29, 1958

2,845,013

DIAPHRAGM-ADJUSTING MECHANISM FOR PHOTOGRAPHIC OBJECTIVES

Karl Heinz Schütz, Kreuznach, Rhineland, Germany, assignor to Jos. Schneider & Co., Optische Werke, Kreuznach, Rhineland, Germany, a German firm Application January 17, 1956, Serial No. 559,738

Claims priority, application Germany January 22, 1955

3 Claims. (Cl. 95—64)

My present invention relates to a photographic objective having means for preselecting a desired diaphragm opening and for temporarily readjusting the diaphragm to a position of maximum opening, e. g. during focusing, followed by a resetting of the diaphragm to its preselected position. Arrangements of this type, in which the resetting may take place by hand or automatically under the control of the shutter release, are particularly useful in the case of the so-called one-eyed reflex-type cameras in which the same objective serves for both focusing and picture-taking.

An object of the instant invention is to provide a diaphragm-adjusting arrangement whereby the aforedescribed operations can be carried out with greatest convenience and without the risk of objectionable impacts which could dislodge the diaphragm control mechanism from its preselected position or otherwise interfere with the proper performance of a camera so equipped.

A more particular object of this invention is to provide an arrangement of this character adapted for use in combination with a diaphragm control mechanism of the type having cam means cooperating with a spring-biased setting member determining the position of the leaves of an iris diaphragm.

According to a feature of my invention, the setting member mentioned above is provided with a projection so positioned in the path of a deflector as to disengage the setting member, in response to a movement of the deflector, from a curvilinear guiding surface of its cam means, against which it is normally urged by a spring, and to move this setting member into an extreme position corresponding to maximum opening of the diaphragm controlled thereby.

The invention will be better understood from the following detailed description of a representative embodiment, reference being had to the accompanying drawing in which.

Figure 1:
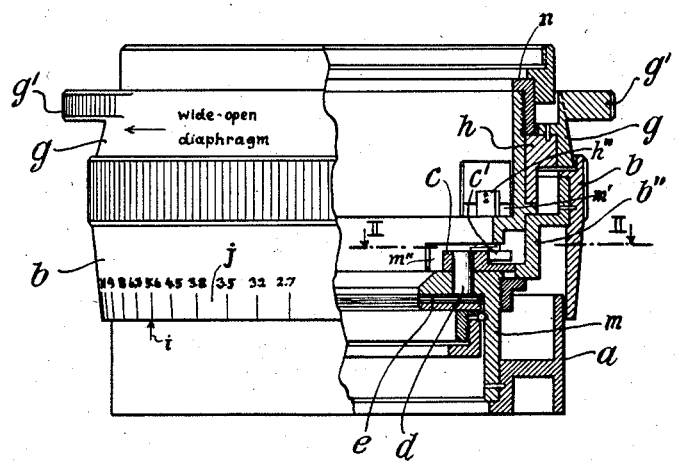
Fig. 1 is an elevational view, partly in section, of a photographic objective equipped with a diaphragm-adjusting mechanism according to the invention.

The body of the objective shown in Fig. 1 comprises an outer ring $a$ rigid with an inner ring $m$, the latter serving as a support for some of the objective lenses (not shown) and for the iris leaves $e$ of a conventional diaphragm. One of these iris leaves is extended, in a manner known per se (e. g. as described in copending application Ser. No. 373,327, filed on August 10, 1953, by Franz Werner, and now Patent Number 2,803,182, and owned by the assignee of the present application), to form a lever $e'$ pivotally mounted on its supporting ring $m$, this lever being adapted to change the diaphragm opening $r$ defined by the leaves $e$ by swinging on its pivot pin $d$ to which it is fixedly secured.

Outer ring $a$ carries an indicator $i$, co-operating in well known manner with a scale $j$ which is carried by a diaphragm-adjusting ring $b$. The latter is fastened onto an annular cam member $b''$ which is rotatable relative to rings $a$, $m$ and is provided with a curvilinear inner shoulder $b'$ serving as a guiding surface for a cam follower $c$ fixed to pivot pin $d$. A contractile spring $f$, anchored at $k$ to ring $m$, engages a spur $c''$ on follower $c$ in a sense urging the latter into contact with curvilinear guiding surface $b'$. It will thus be seen that rotation of adjusting ring $b$ on the objective body $a$, $m$ will cause a camming action between surface $b'$ and follower $c$ which in turn places the diaphragm-setting lever $e'$ in a position corresponding to a selected diaphragm opening. This arrangement allows the diaphragm scale to be spread over a wide angle (e. g. 180°) and to be provided with uniformly spaced graduations including the usual stops as well as intermediate values.

Figure 2:
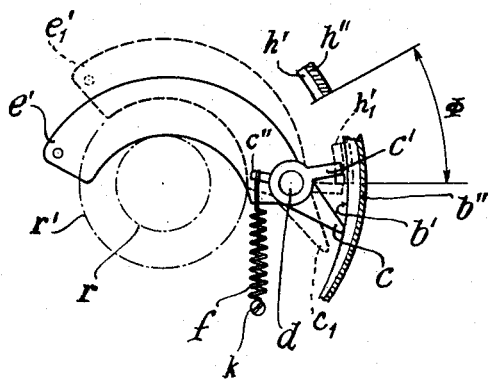
Fig. 2 is a detail view, taken on the line II—II of Fig. 1, of the principal elements of the mechanism shown in Fig. 1.
Figure 3:
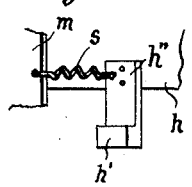
Fig. 3 shows a detail of the mechanism of Figs. 1 and 2.

A control ring $g$, rigid with a deflector ring $h$, is rotatable relative to the objective body independently of the movement of adjusting ring $b$ and is provided with lugs $g'$ facilitating such rotation. Depending from ring $h$ is a deflecting arm $h''$ which is normally held in a position remote from follower $c$, e. g. simply by friction or with the aid of a spring $s$ anchored to ring $m$ as shown in Fig. 3. The required relative mobility between rings $h$ and $m$ is provided by means of a clamping ring $n$, which confines ring $h$ between itself and a shoulder on ring $m$ by threadedly engaging the latter ring, and by a cutout $m'$ in ring $m$ which accommodates the arm $h''$ and enables its displacement through a small angle Φ (Fig. 2), e. g. of about 30°.

A lug $c'$, rigid with cam follower $c$, is positioned in the path of an extension $h'$ of arm $h''$ which is received in a second cutout $m''$ of ring $m$ serving to accommodate, in addition, the tip of follower $c$ as it contacts the cam surface $b'$. When, by a clockwise movement of control ring $g$, and thereby, of arm $h''$ (as viewed in Fig. 2), the deflector $h'$ is brought into the position shown in dotted lines at $h_1'$, it displaces the lug $c'$ against the force of spring $f$ and causes follower $c$ as well as setting lever $e'$ to assume the positions indicated at $c_1$ and $e_1'$, respectively; this movement of the setting lever changes the position of the iris diaphragm from the preselected opening $r$ to its maximum opening $r'$.

When the deflector $h'$ has been restored to its normal position, or at least rotated counterclockwise sufficiently to disengage the lug $c'$, spring $f$ returns the diaphragm to the control of ring $b$ by again urging follower $c$ into contact with shoulder $b'$ thereof. This return movement of the deflector may be carried out by voluntary manual displacement of ring $g$, or automatically with the aid of spring $s$ as by inactivating a suitable detent through the operation of the camera shutter (not shown) in a manner which is well known per se.

The principles herein disclosed may, of course, be embodied in a variety of modifications and adaptations without departing from the spirit and scope of the invention as defined in the appended claims.

I claim:

1. In a photographic objective, in combination, a diaphragm provided with a setting lever adjustable between positions of minimum and maximum opening, a fixed support for said diaphragm, said setting lever being provided with a pivot rotatably held on said support, spring means engaging said setting lever and urging same toward said position of minimum opening, a diaphragm-setting ring rotatable on said support about said diaphragm and provided with a curvilinear guiding surface, a follower member on said pivot rigidly connected by it with said setting lever, said follower member being normally urged by said spring means into camming engagement with said guiding surface, abutment means on said follower member, and a control ring rotatable on said support about said diaphragm independently of said diaphragm-setting ring and provided with an extension adapted to engage said abutment means upon displacement of said control ring from a normal position, said control ring being operable by such engagement to disengage said follower member from said guiding surface and to move said setting lever into said position of maximum opening.

2. The combination according to claim 1, wherein said diaphragm is of the iris type, said lever constituting an iris leaf for said diaphragm.

3. The combination according to claim 1, further comprising restoring spring means tending to maintain said control ring in said normal position.

References Cited in the file of this patent

UNITED STATES PATENTS

| | | |
|---|---|---|
| 871,654 | Watkins et al. | Nov. 19, 1907 |
| 2,340,573 | Aiken | Feb. 1, 1944 |